Figure 1:
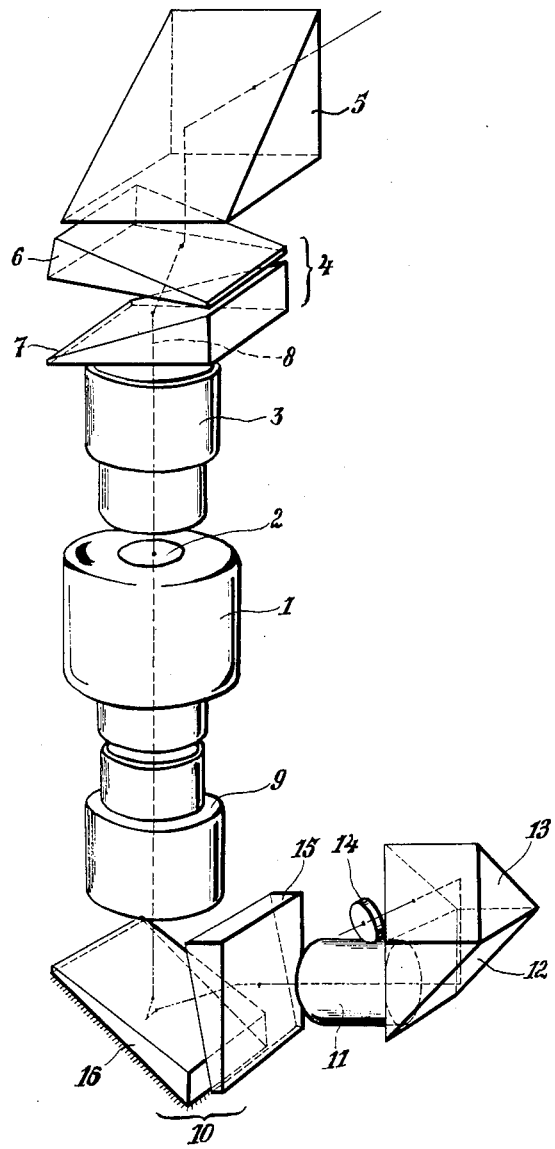

INVENTOR.
ALBERT BOUWERS

United States Patent Office 3,200,250
Patented Aug. 10, 1965

3,200,250
OBSERVATION INSTRUMENT WITH IMAGE CONVERTER TUBE AND PRISM ANAMORPHOSERS
Albert Bouwers, The Hague, Netherlands, assignor to N.V. Optische Industrie de Oude Delft, Delft, Netherlands
Filed Oct. 20, 1960, Ser. No. 63,898
Claims priority, application Netherlands, Oct. 22, 1959, 244,603
7 Claims. (Cl. 250—77)

The invention relates to an optical observing instrument which is provided with an image converter. A typical instrument of this type is the infra-red telescope such as used in combination with infra-red head lights on military vehicles which should be driven during the night without being visible to the enemy. It is highly desirable, of course, to make the fields of view of such instruments as large as possible in order to facilitate the orientation of the driver in the terrain which is in front of the vehicle. However, as is well-known, it is very difficult to make a well-corrected objective for projecting the image of the scene onto the photo cathode of the image converter which, in addition to the required extreme luminosity has a field of view much wider than, e.g., 30°.

The present invention has for its principal object to provide means to increase the field of view of instruments of the type referred to at least in the horizontal meridional plane while using the relatively narrow angle objectives and converter tubes available.

In accordance with my invention, I incorporate both in the front optical system which projects an image of the scene on the photo cathode of the image converter tube and in the rear optical system through which the fluorescent image on the screen of the image converter tube is observed anamorphosing systems which consist of prisms and have opposite anamorphosing effects, such that the images on the photo cathode and the image screen are compressed in one meridional plane, the two anamorphosing systems being so constructed and disposed that the variations in anamorphotic magnification according to the field angle in one anamorphosing system are, to a substantial degree, compensated by the variations in the other system.

As is well-known anamorphotic systems may be constructed in different ways. They may consist of cylindrical or torical lenses and mirrors. Alternatively they may be composed of prismatic wedges whose refracting edges are perpendicular to the anamorphotic or active meridian plane and which are placed in a position different from the position of minimum deviation in a beam of substantially parallel light rays. Systems of cylindrical or torical lenses or mirrors are not feasible for the purpose of increasing the horizontal field of view of instruments as herein discussed. Their dimensions, in the case of fields of 30° and more which are very much larger than the fields usual in cinematography, would be excessive and would exclude their accommodation in the space available in military vehicles. Moreover, in order to secure that the image definition in the edges of the field will still be sufficient, the lens or mirror systems would have to be of a complicated construction which would require a still greater length. On the other hand, the application of anamorphosers consisting of prisms is opposed by the well-known draw-back that prism anamorphosers exhibit rather large variations of the anamorphotic factor or magnification as a function of the field angle. The anamorphotic factor is herein understood as the proportion to which the imagine is compressed or expanded in any point of the field. In wide-screen cinematography, prism anamorphosers are practically solely used for projection and, consequently, will not have to cope with field angles larger than 2x10°. Under that condition the above mentioned distortion due to varying anamorphotic magnification may be reduced to permissible values (e.g., lower than ±10%). It is well-known, however, that for field angles which are much larger the dependability of the magnification on the field angle makes the prism anamorphoser unworkable for any practical purpose, except perhaps for a hypothetical case in which the complication of a large number of prisms in series and the inherent extreme increase of the dimensions of the objective might be feasible.

The present invention represents the insight that in the specific case of an observing instrument having an image converter a considerable angular dependability may be permitted since the variation in magnification in one system may be compensated at least to a substantial extent by the variation in the other system. Thus it is possible according to my invention to make use of prism anamorphosers of simple construction and small dimensions which may easily be accomodated in the narrow spaces which are usually available.

Figure 2:
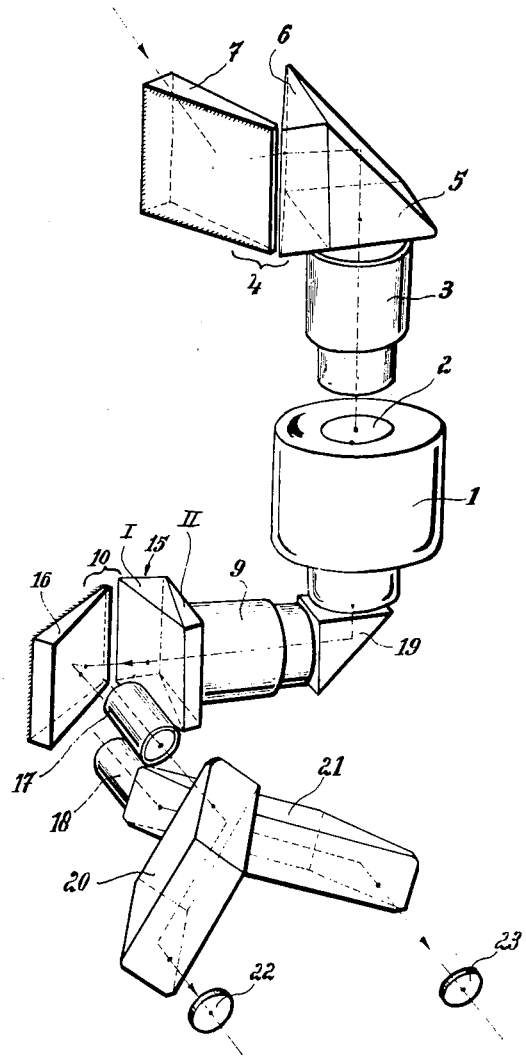

The invention will be understood more fully when reading the following description of some of its embodiments which are illustrated in the accompanying drawings. In the drawings FIG. 1 is a perspective view of a monocular infra-red periscope constructed in accordance with my invention;

FIG. 2 is a perspective view of a binocular infra-red periscope.

In the figures like parts are indicated by like reference numerals. The instrument housings and other mechanical or optical parts which are not essential for a good comprehension of the present invention have been omitted for the sake of clarity.

The instrument of FIG. 1 contains an infra-red image converter 1. On the photo cathode 2 of the image converter an infra-red radiation image of the scene in front of the periscope is formed by an optical system consisting of an extremely luminous objective 3 having a symmetrical field in the order of 27°, a prism anamorphoser 4 of well-known construction having an anamorphotic factor of 1.5 and a 45°-prism 5 which bends the optical axis through 90° downward. For convenience this optical system is termed front optical system as in the path of the light rays it is placed in front of the image converter. Similarly, the optical system permitting the observation of the screen of the image converter is termed herein rear optical system as, in the path of the light, it is placed in rear of the converter tube. The prism anamorphoser 4 increases the horizontal field of the optical system to 40°. It is constructed of two wedge-shaped prisms 6 and 7 which have apex angles of 27° and have their apices pointing in opposite directions. They are positioned such that the optical axis 8 is perpendicular to the exit surfaces of both prisms. Under these conditions and if the refractive index of the prisms is 1.5, the anamorphotic factor may vary from 1.50 in the center to 1.72 and 1.96 at the edges of a 45° field. Such large variations up to nearly 30% generally are not permissible in practice.

The image screen of the image converter 1 is observed at a certain magnification through a rear optical system which also normalizes the compressed fluorescent image and provides for the required direction of view and the correct image orientation. It consists of an objective 9 whose focal plane on the object side coincides with the image screen and which, accordingly, produces parallel beams of light, a prism anamorphoser 10 of a special type which also bends the optical axis through 90°, a telescope objective 11, two 45°-prisms 12 and 13, and an eye piece schematically indicated as a lens 14. Prism anamorphosers such as the one designated 10 are described in detail in my copending patent application Serial No.

63,836 filed October 20, 1960 and will not be described in detail here. Characteristic for these anamorphosers is a reflective surface which is provided on or near the back surface of a wedge-shaped prism such as 15 and which causes the light rays to traverse the prism twice. A second wedge 16 of the anamorphoser increases the anamorphotic factor, and corrects for part of the chromatic aberrations and of the distortion due to variations in magnification. The reflective surface associated with prism 15 may be at some distance from the back surface of this prism provided that it is parallel to the refracting edge of the prism. The anamorphoser 10 bends the optical axis through an angle of 90°. The system 10, similar to the anamorphoser 4 in the optical system in front of the image converter, has considerable residual variations of the anamorphotic magnification with the field angle. However, these variations are of opposite sign and compensate part of the variations of the latter system. It will be seen, that by suitably selecting the data of the various prisms dependent on the field for which the objective 9 is applied, an image may be obtained which is to a large extent free from horizontal angular distortion.

As the figure illustrates, in accordance with the invention a considerable increase of the visual field can be obtained by means of anamorphosis without increasing the dimensions of the instrument seriously.

This holds even more, particularly in respect of the vertical dimension of a periscope, if in the front optical system likewise use is made of a prism anamorphoser one of whose prisms is traversed twice. Thereby it becomes possible to accommodate the anamorphoser beside the 45°-prism instead of under it, as was the case in FIG. 1.

In FIG. 2 this construction is illustrated. The 45°-prism 5 has now its reflecting surface parallel to the direction of view of the periscope. On the front surface of prism 5 one of the prisms 6 of the anamorphoser 4 is cemented which is similar in construction to the system 10 of FIG. 1. Of the other prism 7 the back surface is made reflective whereby the rays traverse the prism twice.

The magnifying rear optical system in FIG. 2 is binocular. The parallel beams in which the anamorphosing system 10 is placed are derived in a way similar to FIG. 1, i.e., by means of a collimating objective 9 which images the screen of image converter 1 at infinity. The parallel beams leaving the objective 9 traverse the prisms 15 and 16 of the anamorphoser 10 and then enter the telescope objectives 17 and 18 which have their axes parallel. A 45°-prism 19 bends the optical axis between the image converter tube and the collimating objective.

One of the prisms of the anamorphoser 10 in FIG. 2 is made in the form of a doublet in order to correct for the chromatic error due to the nonmonochromatic character of the fluorescent light of the image screen. The prisms of the anamorphoser 4 are not achromatized, though, by suitable selection of the glasses it will be possible, to a certain extent that each of them compensates for the chromatic error of the other. In the case of the anamorphoser 4 individual achromatization of the prisms is not necessary as the infra-red radiation used by the periscope covers a very narrow spectral range.

The optical data of the systems 4 and 10 of FIG. 2 are as follows:

|  | Prism | Apex Angle | Glass | |
|---|---|---|---|---|
|  |  |  | $n_d$ | Abbé Number |
| System 4 | 6 | 20°3′ | 1.785 | 25.71 |
|  | 7 | 6° | 1.526 | 60.09 |
|  | I | 40° | 1.620 | 60.29 |
| System 10 | 15 |  |  |  |
|  | II | 16°17′ | 1.620 | 36.34 |
|  | 16 | 6° | 1.517 | 64.20 |

The angle of incidence of the optical axis on prism 7 is 47°. The angle of refraction of the axial ray when leaving the prism 16 is likewise 47°. The axial ray enters prism 15 perpendicularly. Suppose that the focal lengths of the objectives 3 and 9 are both 40 mm. and the effective diameter of photo cathode and image screen of the image converter are 18.5 and 12.5 mm., respectively, then the anamorphotic factors of the system 4 for the center and the edges of the field are 1.4, 1.6 and 1.8, respectively. For the system 10 these values are 1.45, 1.55 and 1.6, respectively. Thus, the residual anamorphotic magnification in the image varies from 0.97 in the center to 1.02 and 1.11 in the periphery of the image which, of course, is hardly perceptible. It is observed, moreover, that this residual distortion could be avoided, if desired, e.g. by selecting equal angular field for the objectives 3 and 9 and making the anamorphosers identical.

What I claim is:

1. An optical observing instrument comprising an image converter having a photo cathode and a fluorescent image screen and having its axis vertical, a first optical system projecting an image of a scene to be observed onto said photo cathode, said first optical system including an objective lens and a stationary prismatic anamorphosing wedge having its refracting edge vertical and being disposed to receive light rays from said scene on its front surface which is inclined to the line of sight of the instrument, a first plane reflector vertically disposed at the rear of said wedge to reflect light rays refracted by said wedge and cause such light rays to traverse said wedge once more along a different path, and a second plane reflector substantially on the same horizontal level as said wedge and disposed on top of said image converter to reflect light rays from said wedge down to said photo cathode, and said instrument further comprising a second optical system permitting observation of the fluorescent image on said image screen, said second optical system including a prismatic wedge anamorphosing means in stationary relation to said image screen having an anamorphosing effect opposite to that of said prismatic wedge in said first optical system to thereby decompress said fluorescent image.

2. An optical observing instrument as claimed in claim 1 wherein said second optical system further includes an objective collimating the light received from said image screen and a telescope receiving such collimated light, said anamorphosing means being arranged in the path of the collimated light between said objective and said telescope and including a wedge-shaped anamorphosing prism disposed to receive the collimated light on its front surface which is inclined to such light, and a plane reflector disposed at the rear of said prism parallel to the refracting edge thereof to reflect light rays refracted by said prism and cause such light rays to traverse said prism once more along a different path.

3. An optical observing instrument comprising an image converter having a photocathode and a fluorescent screen, a first optical system having an optical axis for projecting an image of a scene to be observed onto said photocathode, said first optical system including an objective lens and a first prism anamorphoser in stationary relation to said photocathode to compress the image on said photocathode in one fixed meridian plane, and a second optical system having an optical axis for observing the fluorescent image formed by said image converter on said fluorescent screen, said second optical system including a second prism anamorphoser in stationary relation to said fluorescent screen disposed so as to have an anamorphosing effect opposing that of said first prism anamorphoser in the same fixed meridian plane whereby said fluorescent image is decompressed, said first and second prism anamorphosers each exhibiting significant variations in anamorphotic magnification according to the inclination of incident pencils to the respective optical axes, the variations in anamorphotic magnification of said first prism anamorphoser being in a substantial degree compensated by the variations in anamorphotic magnificaiton of said second anamorphoser.

4. An optical observing instrument comprising an image converter having a photocathode and a fluorescent screen, a first optical system for projecting an image of a scene to be observed onto said photocathode, said first optical system including an objective lens and a first prism anamorphoser in stationary relation to said photocathode to compress the image on said photocathode in one fixed meridian plane, and a second optical system for observing the fluorescent image formed by said image converter on said fluorescent screen, said second optical system including a second prism anamorphoser in stationary relation to said fluorescent screen disposed so as to have an anamorphosing effect opposing that of said first prism anamorphoser in the same fixed meridian plane whereby said fluorescent image is decompressed, each of said first and second prism anamorphosers consisting of two prisms disposed in the form of a V and with their bases oppositely arranged, the base of one and the apex of the other forming the V apex.

5. In a periscope type optical observing instrument, in combination, an image converter having a photocathode and a fluorescent image screen and having its axis vertical, a first optical system having an optical axis and projecting an image of a scene to be observed onto said photocathode, said first optical system including an objective lens, first and second plane reflecting surfaces and a prism type anamorphoser for causing the image on said photocathode to be compressed in the horizontal field meridian, said first reflecting surface being disposed vertical and inclined to the line of sight of the instrument to reflect incident light rays from the scene to said second reflecting surface, the latter being disposed on top of said image converter substantially on the same horizontal level as said first reflecting surface to deflect incident light rays down to said photocathode, said prism anamorphoser comprising a wedge shaped prism disposed in front of and close to said first reflecting surface with its active surfaces vertical and inclined to the line of sight in the same sense as said first reflecting surface, the apex of said prism pointing away from the scene, said prism being traversed along different optical paths by the light rays both prior to and after incidence on said first reflecting surface so as to produce anamorphotic compression of the image on said photocathode, and a second optical system permitting observation of the fluorescent image on said image screen, said second optical system including a second prism type anamorphoser so disposed as to have its anamorphosis opposing that of said first anamorphoser in said first optical system in the same meridian to thereby decompress said fluorescent image.

6. In an optical observing instrument the combination of claim 5 wherein said first anamorphoser further comprises a second anamorphosing prism arranged between said first and second reflecting surfaces for being traversed once by the light rays travelling between such reflecting surfaces, said second prism having its active surfaces vertical and its apex pointing to the scene, and said second prism, together with said wedge shaped prism disposed in front of said first reflecting surface, defining the legs of a V.

7. In an optical observing instrument the combination of claim 5 wherein said second optical system further includes an objective lens having an optical axis to collimate the light received from said image screen, a third plane reflecting surface in the path of such collimated light and inclined to said optical axis for deflecting such collimated light, and a telescopic viewing system receiving such collimated light after deflection, and wherein said second anamorphoser comprises a second wedge shaped prism disposed between said collimating objective lens and said third plane reflecting surface with its refracting angle parallel to said third reflecting surface, said second wedge shaped prism being close to and inclined in the same sense to said optical axis as said third plane reflecting surface and having its apex pointing towards said collimating objective lens, said prism being traversed along different optical paths by the collimated light both prior to and after incidence on said third reflecting surface so as to produce anamorphotic decompression of said fluorescent image.

References Cited by the Examiner

UNITED STATES PATENTS

| | | | |
|---|---|---|---|
| 2,088,660 | 8/37 | Newcomer | 88—57 |
| 2,631,490 | 3/53 | Sackville | 88—1 |
| 2,825,815 | 3/58 | Dis Ario | 250—83.3 |
| 2,975,668 | 3/61 | Eckel | 88—1 |

FOREIGN PATENTS 250,784 9/12 Germany.

JEWELL H. PEDERSEN, *Primary Examiner.*

EMIL G. ANDERSON, *Examiner.*